Figure 1:
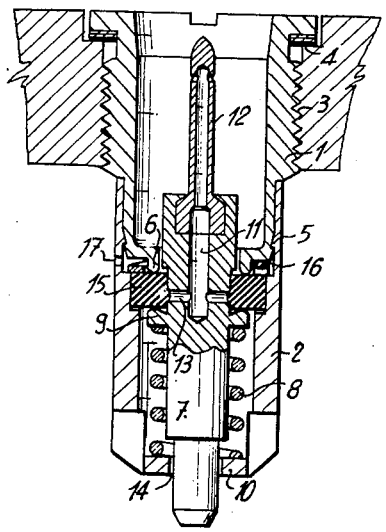

April 16, 1963     C. ZELLWEGER     3,085,601
GAS FUELED LIGHTER VALVE

Filed Aug. 31, 1960     2 Sheets-Sheet 1

INVENTOR.
CONRAD ZELLWEGER.
BY
Ward, Neal, Haselton, Orme & McElhannon
ATTORNEYS.

United States Patent Office 3,085,601
Patented Apr. 16, 1963

3,085,601
GAS FUELED LIGHTER VALVE
Conrad Zellweger, Chene-Bougeries, Geneva, Switzerland, assignor to La Nationale S.A., Geneva, Switzerland, a corporation of Switzerland, and Ronson Corporation, Woodbridge, N.J., a corporation of New Jersey, jointly
Filed Aug. 31, 1960, Ser. No. 53,259
Claims priority, application Switzerland Sept. 8, 1959
13 Claims. (Cl. 141—293)

This invention relates to cigar lighters of the type fueled by gas, and more particularly to fuel charging means carried by the casing of the lighter and including a valve means therefor.

Valves for filling reservoirs with liquefied gas by means of a refill vessel having a connecting member are already known: such a valve comprises at least one outer or fixed member, one inner or movable member and a sealing member. Such valves also have an inlet passage for liquefied gas and an exhaust passage to put the reservoir in communication with the atmosphere, the valve being actuated by the connecting member on the refill vessel.

Valves of this type specially intended for filling the reservoir of a lighter using liquefied gas are described, for example, in U.S. Patent Nos. Re. 24,163; 2,895,633; and 2,882,940.

The valves described in these different patents are satisfactory from a functional point of view but their manufacture is relatively complicated and costly.

In the different valves described in the cited patents, certain of them utilize several sealing members while others have only one. In the valves having only one sealing member, this member, in order to ensure the closing of the inlet passage and the exhaust passage, cooperates either with the fixed or with the movable valve member. Thus, the closing of the two passages is always effected by the cooperation of the sealing member with one of these two valve members alone.

The present invention has, as its object, a valve for the refilling of a reservoir with liquefied gas by means of a refill vessel having a connecting member whose manufacture is considerably more simple and cheaper than that of the known valves without any prejudice to its working. This valve comprises at least one fixed member, one movable member and a sealing member and has two passages, one being an inlet passage for liquefied gas and the other an exhaust passage to put the reservoir in communication with the atmosphere, the valve being intended to be actuated by the connecting member of the refill vessel. The valve is characterized in that in the closed position the sealing member is in contact, on the one hand, with the movable member to ensure the closing of one of the said passages and, on the other, with the fixed member to ensure the closing of the other passage; at least one portion of this sealing member being capable of displacement in relation to the fixed member to induce the opening of the latter exhaust passage when the valve is in the open position.

The drawings annexed represent schematically and by way of example several embodiments of the object of the invention.

Figure 2:
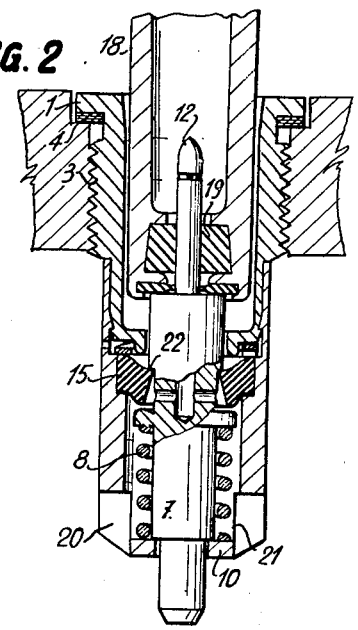

FIGS. 1 and 2 represent a section of a first embodiment and show a valve, respectively, in the closed and open positions.

FIGS. 3 to 6 also show in the closed and open positions, respectively, two other embodiments.

Figure 7:
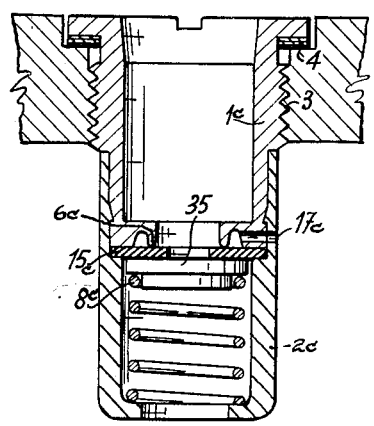
Figure 8:
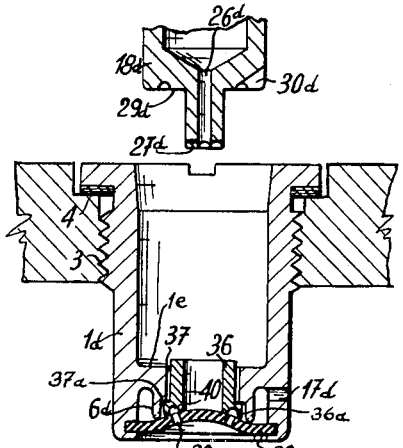

FIGS. 7 and 8 represent, still in section, two other embodiments.

The valves described by reference to FIGS. 1 and 2 comprise an outer or fixed member made in two sections, 1 and 2; section 1 has a threaded portion 3 enabling the valve to be fixed into the corresponding threaded bore on the reservoir for liquefied gas so that the latter may be refilled. Fluid-tightness between the valve and the reservoir is ensured by a washer 4. The lower part of section 1 has on its outer wall an annular rib forming a boss for an internal annular shoulder 5 on section 2. Sections 1 and 2 are thus a force fit so as to constitute in fact one single part. The base of section 1 has a central aperture which is defined by an annular rib 6. An inner or movable member 7 moves in this central aperture and is subjected to the action of a spring 8 bearing on the one hand against a shoulder 9 on this member 7 and, on the other, against the base 10 of section 2. The inner or movable member 7 has a blind longitudinal bore 11 terminating in a hollow needle 12 on the one hand and in a transverse bore 13 on the other. The lower end of the inner or movable member 7 is able to slide in a hole 14 in the base 10.

The valve shown includes a sealing member consisting of a washer 15 of a resilient substance located in the interior of the outer or fixed member and abutting with one of its faces against the annular rib 6, because of the pressure exerted on it by the shoulder 9 of the inner or movable member 7. The washer 15 bears with its edge (against part) 2 and with its inner edge against the periphery of the inner or movable member 7 where the radial bore 13 opens out. In the space between the annular rib 6 and the wall of section 2 is located a washer 16 undulating in shape, the function of which is to keep the washer 15 in place. This space is connected with the interior of the reservoir to which the valve is fixed by an aperture 17.

In the closed position of the valve shown in FIG. 1, the sealing member 15 consisting of the washer 15 is compressed between the shoulder 9 of the part 7 and the annular rib 6 which prevents all connection between the interior of the reservoir and the exterior. FIG. 2 shows the valve in the open position, this opening being induced by a downwards displacement of the member 7 against the action of the spring 8 by reason of the force exerted on a connecting member 18 of a refill vessel. This connecting member includes a lozenge shaped element 19 of a resilient substance which is pierced by the hollow needle 12. Because of the displacement of the movable member 7, the washer 15 is deformed by virtue of a shoulder 22 on the movable member and its upper face is removed from the annular rib 6 which induces the opening of the exhaust passage. The gas can thus escape to atmosphere through aperture 17 then across the space defined by section 2 and the annular rib 6, this space not being completely closed up since the washer 16 undulates. The gas can thereafter escape towards the exterior by virtue of play left between the member 7 and the central aperture of the fixed member which is defined by the annular rib 6 and by the play existing between the internal wall of section 1 and the connecting member 18 of the refill vessel.

Liquefied gas under pressure contained in the refill vessel can reach the reservoir by flowing through the hollow needle 12, the bores 11 and 13 and the space defined by the lower portion of member 7 and the inner wall of section 2. It can be seen that this space is connected with the interior of the lighter by virtue of two orifices 20 and 21 formed in the bottom of section 2 as by countersinking.

Thus the arrangement of this valve leads when the member 7 is displaced, first to the opening of the exhaust passage by the removal of the upper face of washer 15 from the annular rib 6 then to the opening of the inlet passage by the deformation of the inner edge of the washer 15 uncovering the transverse bore 13.

When the reservoir is full of liquefied gas, the latter escapes through aperture 17 and comes out in the form of droplets by way of the passage allowed between section 1 and the connecting member 18. The user is thus warned that the reservoir is full and he must withdraw the refill vessel which allows member 7 to return to the position shown in FIG. 1 under the action of the spring 8. The valve is closed again and so is the refill vessel, the closing of the latter being ensured by the element 19 which is compressed in such a manner that the hole made by the needle 12 closes of its own accord when the needle is removed.

Figure 3:
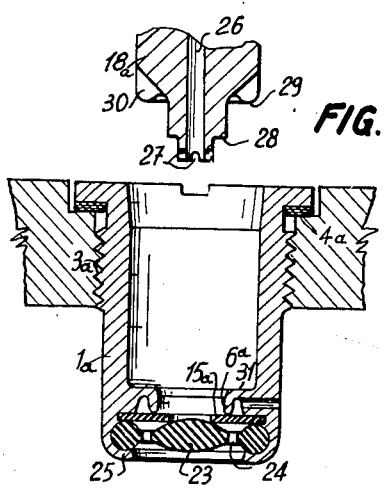
Figure 4:
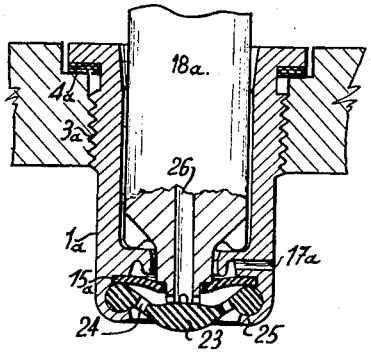

FIGS. 3 and 4 concern a much simpler embodiment in which the fixed part is in a single unit 1a. This part has, as before, a threaded portion 3a, a sealing washer 4a and an annular rib 6a defining a central aperture. Below this rib 6a is located a sealing member consisting of a washer 15a, very much thinner than in the preceding embodiment. The inner or movable part of the valve consists of a rubber membrane 23 which is located on the side of the washer 15a removed from the face which is to close with or engage the annular rib 6a. The central portion of this membrane 23 is enlarged and bears against the washer 15a to close its central aperture which constitutes the inlet passage. The membrane 23 has a series of ports 24 disposed about the enlarged portion of the periphery which is circular in plan view and held in position by a rim 25 of member 1a. In the upper section of FIG. 3 the end of the connecting member 18a on the refill vessel can be seen. This end must take a special form to ensure the correct functioning of the valve. This connecting member 18a has a longitudinal bore 26 for the passage of liquid gas, this bore terminating at the end of the connecting member 18a where there are milled recesses 27. The connecting member 18a has two more shoulders 28 and 29 increasing in diameter, the shoulder 29 being pierced by milled recesses 30. The connecting member 18a does not carry any closure means and it is fixed on a refill vessel including a valve whose opening is governed by a displacement of the connecting member 18a in relation to the said vessel.

When the connecting member 18a is inserted in the valve, its end bears against the enlarged portion of the membrane 23 while its shoulder 28 abuts the inner edge of the washer 15a so as to form a fluid-tight seal. The connecting member 18a may be inserted in the central aperture until the shoulder 29 abuts on the annular wall 31 carrying the rib 6a. At this stage the washer 15a and the membrane 23 occupy the positions shown at FIG. 4 and when the valve on the refill vessel is open, liquid gas can flow into the reservoir by way of bore 26, the milled recesses 27 and the ports 24 in the membrane 23, while a part of the gas present in the reservoir may escape by an aperture 17a in passing between the washer 15a and the rib 6a, then through the milled recesses 30 and finally through the space existing between the inner wall of the fixed part 1a and the connecting member 18a.

Figure 5:
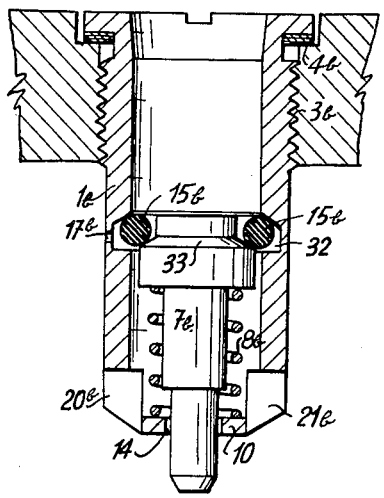
Figure 6:
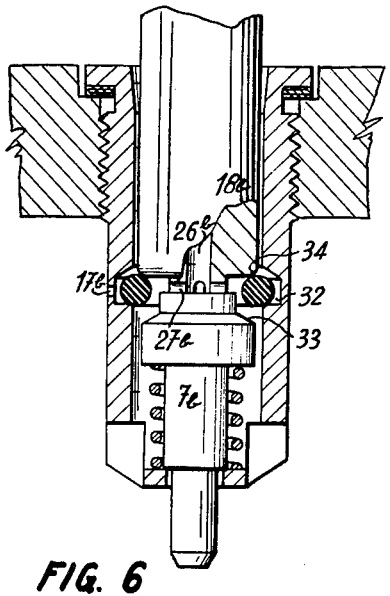

FIGS. 5 and 6 show in the closed and open positions, respectively, a valve wherein the outer or fixed member 1b is tubular. The inner face of this fixed member has an annular groove 32 pierced at its base by a radial bore 17b emerging on the outer face of part 1b; the seal 15b comprises a rubber ring circular in plan view which is located partly in this groove 32. The inner or movable member 7b is located within the fixed member 1b and is subjected to the action of a spring 8b urging it towards the exterior of the reservoir. This inner or movable member 7b has a shoulder 33 which under the action of the spring 8b bears against the seal 15b to hold it firmly against the upper edge of the groove 32, thus ensuring that the valve is closed. The lower portion of member 1b is substantially the same as the lower part of section 2 in the member shown in FIGS. 1 and 2, and it has two milled ports 20b and 21b.

FIG. 6 shows this valve in the open position which is effected by displacing the inner or movable member 7b through the action of the connecting piece 18b on the refill vessel. As in the embodiment in FIGS. 3 and 4, this connecting member has a longitudinal bore 26b and milled apertures 27b to allow the passage of liquid gas between the end of the connecting member 18b and the upper face of the inner movable member 7b. The connecting member also has a shoulder 34 which bears against the seal 15b to move it against the lower edge of the groove 32. In this position the seal 15b acts as a stop member for the connecting member 18b and the blocking of this connecting member 18b may be used to open the valve on the refill vessel. It will be seen that in the position shown in FIG. 6 the compression of the seal 15b between on the one hand the shoulder 34 of the connecting member 18b and on the other the lower edge of the groove 32, separates in a fluid-tight manner the inlet passage formed by the milled apertures 27b and the space between part 7b and part 1 and the exhaust passage formed by the radial bore 17b, the bottom of the groove 32 and the space between the connecting member 18b and the inner wall of the fixed part 1b.

FIG. 7 shows another embodiment which is substantially like that in FIGS. 3 and 4. In this embodiment the membrane 23 is replaced by a metal valve closure member 35 subjected to the action of a spring 8c and which constitutes the inner or movable member, the closure member 35 bearing against the lower face of the washer 15c which is the sealing member. As in the embodiment in FIGS. 3 and 4, the upper face of the washer 15c cooperates with annular rib 6c to cover the exhaust passage which also consists of a bore 17c. The outer or fixed member is made in two sections 1c and 2c in a like fashion to the embodiment shown in FIGURES 1 and 2.

In the embodiment shown in FIG. 8 the inner or movable member consists of a tubular member 36 capable of sliding roughly in a recess 37 on the outer or fixed member 1d. Stop means, consisting of an exterior annular shoulder 36a on the tubular member 36 and a corresponding shoulder 37a on the recess 37, limit the displacement of the inner or movable member 36 towards the exterior of the reservoir. The end of the recess 37 which is on the inner side of the reservoir is surrounded by an annular rib 6d, against which abuts a membrane 38 of a resilient substance which constitutes the sealing member. This membrane has a series of ports 39 which are formed opposite an annular groove 40 on the lower edge of the tubular member 36 which points towards the interior of the reservoir.

In the closed position of the valve, as shown in FIG. 8, the membrane 38 is pressed against the annular rib 6d and against the lower edge of the tubular member 36 by the fluid pressure obtaining in the interior of the reservoir. The valve is opened by the insertion of connecting member 18d in the central aperture of the movable member 36. This connecting member 18d is shown in the upper section of FIG. 8 and has, as in the embodiments shown in FIGURES 3 and 6, a longitudinal bore 26d and milled apertures 27d formed on its far end to avoid the bore 26d being closed up by the membrane 38. The connecting member 18d has also a shoulder 29d which bears against a shoulder 1e at the bottom of part 1d on the one hand, and against the upper edge of the member 36 on the other. This shoulder 29d is formed with a milled aperture 30d. When the connecting member 18d is applied to the bottom of the valve, a space is made between the membrane 38 and the lower edge of the aperture in member 36. The shoulder 29d of the connecting member 18d bottoms against member 36 which is displaced downwards and by the movement of its lower peripheral edge moves the membrane 38 away from the annular rib 6d. In this position the valve has two separate passages for exhaust and admission; the inlet passage is formed by the central aperture of the member 36 and by the ports 39 in the membrane 38. The exhaust passage is formed by a radial bore 17d terminating in the annular space surrounding the rib 6d and by the space between the member 36 and the recess 37 of the fixed part 1d and the milled aperture 30d. These two passages are separated from each other by a zone of contact between the outer edge of the lower face of the member 36 and the membrane 38.

What is claimed is:

1. A lighter construction to be charged with liquefied gas fuel under pressure and including in combination, a casing having therein a fuel reservoir, and fuel charging means carried by the casing and affording simultaneous escape of gas from the reservoir and the charging thereof with liquefied gas fuel under pressure, said fuel charging means including an outer valve member fixed with respect to the casing and having therein a socket; a resiliently biased inner valve member mounted upon and for movement relative to said outer valve member between open and closed positions as hereinafter set forth, said fuel charging means being constructed to provide an outwardly extending passage affording the outward escape of gas therethrough from said reservoir to the outer air during charging, and also to provide inward passage of liquefied gas therethrough in said reservoir during charging, said inner valve member having an outer portion engageable with a filling container to afford flow of fuel from such container to said inward passage, said fuel charging means including a movable sealing member activatable during movement of said inner valve member between closed and open positions, said sealing member in closed position sealingly engaging said inner valve member to close one of such passages and sealingly engaging said outer valve member to close the other passage, said sealing member being of flexible material and displaceable from said outer valve member to open one of said passages and movable to open said other passage.

2. A lighter construction, to be charged with liquefied gas fuel under pressure and including in combination, a casing having therein a fuel reservoir, and fuel charging means carried by the casing and affording simultaneous escape of gas from the reservoir and the charging thereof with liquefied gas fuel under pressure, said fuel charging means including an outer valve member fixed with respect to the casing and having therein a socket, a resiliently biased inner valve member mounted to move relative thereto between open and closed positions as hereinafter set forth, said fuel charging means being constructed to provide an outwardly extending passage affording the outward escape of gas therethrough from said reservoir to the outer air during charging and also to provide inward passage for liquefield gas therethrough in said reservoir during charging, said inner valve member having an outer portion provided with a part engageable with a filling container to afford flow of fuel from such a container to said inward passage, said fuel charging means including movable sealing means activated during movement of said inner valve member between closed and open positions, said sealing means sealing said passages against communication with said fuel reservoir and also against communication with each other when said inner valve member is in closed and open positions, said sealing means opening communication from said reservoir through each of said passages when said inner valve member is in open position, said sealing means including a sealing member positioned to sealingly engage said inner valve member to close one of such passages and to sealingly engage the outer valve member to close the other passage when in closed position, said sealing member being displaceable from said outer valve member to open one of said passages when in the open position and movable to open said other passage.

3. A lighter constructed to be charged with liquefied gas fuel under pressure and including, in combination, a casing having therein a fuel reservoir, and fuel charging means carried by the casing and affording simultaneous escape of gas from the reservoir and the charging thereof with liquefield gas fuel under pressure, said fuel charging means including an outer valve member fixed with respect to the casing and having therein a socket, a resiliently biased inner valve member mounted to move between open and closed positions as hereinafter set forth, said inner valve member having a fuel charging passage extending therethrough from an outer portion to an inner portion thereof, said outer portion including a part engageable with a filling container to afford a flow of fuel from such a container to said fuel charging passage, said fuel charging means being constructed to provide an outwardly extending passage affording the outward escape of gas therethrough to the outer air during charging, said fuel charging means also including movable sealing means activated during movement of said inner valve member between closed and open positions, said sealing means providing a seal against the flow of fuel through the passage in said inner valve member into said reservoir when said inner valve member is in closed position, and also providing a seal against the flow of fuel outwardly from said reservoir through said escape passage when said inner valve member is in closed position, said sealing means affording communication through the passage in said inner valve member into said reservoir when said inner valve member is in open position, and also affording communication from said reservoir through said escape passage to the outer air when said inner valve member is in open position, said sealing means including a sealing member which sealingly engages said inner valve member so to close one of such passages and sealingly engages the outer valve member so to close the other passage when in such closed position, said sealing member being of flexible material and displaceable from said outer valve member to open one of said passages when in the open position and movable to open said other passage.

4. A lighter constructed to be charged with liquefied gas fuel under pressure and including, in combination, a casing having therein a fuel reservoir, and fuel charging means carried by the casing and affording simultaneous escape of gas from the reservoir and the charging thereof with liquefied gas fuel under pressure, said fuel charging means including an outer valve member fixed with respect to the casing and having therein a socket, a resiliently biased inner valve member mounted to move between open and closed positions as hereinafter set forth, said inner valve member having a fuel charging passage extending therethrough from an outer portion to an inner portion thereof, said outer portion including a part engageable with a filling container to afford a flow of fuel from such a container to said fuel charging passage, said fuel charging means being constructed to provide an outwardly extending passage affording the outward escape of gas therethrough to the outer air during charging, said fuel charging means also including movable sealing means activated during movement of said inner valve member between closed and open positions, said sealing means sealing said passage in said inner valve member from communication with said reservoir when said inner valve member is in closed position, and also providing a seal against the flow of fuel outwardly from said reservoir through said escape passage when said inner valve member is in closed position; said sealing means affording communication between said passage through the inner valve member and said reservoir when said inner valve member is in open position and also affording communication from said reservoir through said escape passage to the outer air when said inner valve member is in open position, said sealing means including a resilient sealing member which is positioned to sealingly engage said inner valve member to close one of such passages and also to sealingly engage the outer valve member to close the other passage when in closed position, said sealing member being resiliently displaceable from said outer valve member to open one of said passages when in the open position and movable to open said other passage.

5. Apparatus in accordance with claim 2 wherein said sealing member is positioned for separating said passages when the valve is open.

6. Apparatus in accordance with claim 2, including an annular rib extending from said outer valve member and positioned internally thereof, said sealing member being annular and conformed to bear with one of its faces against said rib to close the outward extending passage.

7. Apparatus in accordance with claim 6, wherein said annular rib defines a central orifice through which passes a portion of said inner valve member, the latter including a shoulder for bearing against the other face of said sealing member, and a spring for urging said inner valve member toward its closed position.

8. Apparatus in accordance with claim 7 wherein the periphery of said annular sealing member bears against the inner wall of said outer valve member, the inner face of said sealing member embracing and pressing against a peripheral portion of said inner valve member, the latter having a bore therethrough comprising a portion of said inward passage, said bore having an orifice at such peripheral portion embraced by said sealing member, said inner valve member having a second shoulder positioned for bearing against that face of said sealing member which coacts with said annular rib, said second shoulder in response to displacement of the inner valve member deforming said sealing member first to separate the latter from said rib to open said outwardly extending passage and thereafter to displace the inner face of said sealing member to expose such orifice in said inner valve member thereby to open the inward passage.

9. Apparatus in accordance with claim 6, wherein said inner valve member is positioned on that side of said sealing member which is opposite to the side engaging said annular rib, said inner valve member being conformed to bear against said sealing member to close the central orifice thereof, the latter comprising a portion of the inward passage.

10. A valve structure in accordance with claim 9, wherein said inner valve member comprises a membrane formed with an enlarged central portion and at least one port located between such enlarged portion and the periphery of such membrane.

11. Apparatus in accordance with claim 9, wherein said inner valve member comprises a closure member, and spring means for engaging the face of said sealing member opposite the face which engages the aforementioned rib, said spring urging the sealing member toward the closed position.

12. Apparatus in accordance with claim 2, wherein the inner face of said outer valve member has formed therein an annular groove, passage means placing said groove in communication with the outside of said outer valve member, said sealing member being situated partly in such groove, said inner valve member being mounted for movement within said outer valve member, spring means engaging said outer valve member and also engaging said inner valve member to urge same toward a closed position, said inner valve member having an annular shoulder for bearing against said sealing member to urge same against a portion of such groove thereby to close such inwardly extending passage.

13. Apparatus in accordance with claim 2, wherein said inner valve member is of tubular configuration, said outer valve member having a bore therein in which said inner valve member is positioned for sliding movement, and limit stop means for limiting the extent of such sliding movement of said tubular inner valve member in such bore in one direction, said outer valve member having an annular rib formed at the end of such bore, said sealing member comprising a flexible membrane positioned to be urged against said rib thereby to close such outwardly extending passage, said membrane having a port formed therein comprising a portion of such inward passage, said port being positioned to be closed by said tubular inner valve member in response to said membrane being urged against said rib and said tubular inner valve member, said limit stop means being conformed for then being effective to limit movement of said inner valve member in one direction.

References Cited in the file of this patent
UNITED STATES PATENTS

| | | |
|---|---|---|
| 2,710,506 | Zellweger | June 14, 1955 |
| 2,714,805 | Zellweger | Aug. 9, 1955 |
| 2,882,940 | Zellweger | Apr. 21, 1959 |
| 3,039,499 | Peterson | June 19, 1962 |